(12) United States Patent
Kelly et al.

(10) Patent No.: US 9,263,938 B2
(45) Date of Patent: Feb. 16, 2016

(54) POWER FACTOR CORRECTION

(75) Inventors: Jamie Kelly, North Shields Tyne & Wear (GB); Deepak Makwana, Newcastle Upon Tyne (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/114,202

(22) PCT Filed: Apr. 27, 2012

(86) PCT No.: PCT/EP2012/057730
§ 371 (c)(1),
(2), (4) Date: Oct. 26, 2013

(87) PCT Pub. No.: WO2012/146701
PCT Pub. Date: Nov. 1, 2012

(65) Prior Publication Data
US 2014/0049181 A1 Feb. 20, 2014

(30) Foreign Application Priority Data

Apr. 28, 2011 (GB) .................................... 1107171.9
May 13, 2011 (GB) .................................... 1108029.8

(51) Int. Cl.
*H02M 1/42* (2007.01)
*H05B 37/02* (2006.01)
*H02M 1/00* (2007.01)

(52) U.S. Cl.
CPC .............. *H02M 1/42* (2013.01); *H02M 1/4225* (2013.01); *H05B 37/02* (2013.01); *H02M 2001/0022* (2013.01); *Y02B 70/126* (2013.01)

(58) Field of Classification Search
CPC ........... H02J 3/383; H02M 7/48; H02M 1/12; H02M 1/4208; H02M 1/4225; H02M 1/42; Y10T 307/625; Y02E 10/563; Y02B 70/126; H05B 41/3925; H05B 41/2828; H05B 41/28; H05B 41/2827; H05B 41/2855
USPC ......... 323/205, 207, 210, 211, 222, 271, 288; 363/44, 49, 85, 89; 315/121, 201, 210, 315/224
See application file for complete search history.

(56) References Cited

U.S. PATENT DOCUMENTS 5,107,184 A * 4/1992 Hu et al. ........................ 315/291
5,177,408 A * 1/1993 Marques ........................ 315/291

(Continued)

FOREIGN PATENT DOCUMENTS

| EP | 1603219 A1 | 12/2005 |
| WO | 2011/009717 A2 | 1/2011 |
| WO | 2011/009733 A1 | 1/2011 |

*Primary Examiner* — Vibol Tan
(74) *Attorney, Agent, or Firm* — Volpe and Koenig, P.C.

(57) ABSTRACT

A power factor correction circuit includes an inductor L1, a diode D1, a switch Q3 and a controller 24. An input voltage $V_{in}$ is applied to the inductor L1 which is cyclically discharged through the diode D1 by the operation of the switch Q3. The method of operation includes: operating a controller 24 to obtain an indication of the voltage across the switch Q3, monitoring the indication of the voltage across the switch Q3 to determine when the inductor L1 reaches a discharged state in response to the switch being in an off state, and the switch Q3 being controlled by the controller 24 to vary the on period of the switch Q3, during which the inductor is charged, for adjusting an output voltage $V_{bus}$ towards a target value $V_{bus\_target}$. The controller 24 monitors at least one of the indication of the voltage across the switch Q3 and the ratio of the switch on period $T_{on}$ to the switch off period $T_{off}$ for detecting that the input voltage $V_{in}$ has a low value.

15 Claims, 7 Drawing Sheets

(56) References Cited

U.S. PATENT DOCUMENTS

| | | | |
|---|---|---|---|
| 6,259,613 B1* | 7/2001 | Lee et al. | 363/89 |
| 6,304,465 B1* | 10/2001 | Takita | 363/37 |
| 7,031,173 B2* | 4/2006 | Feldtkeller | 363/89 |
| 7,501,800 B2* | 3/2009 | Kim et al. | 323/207 |
| 7,538,525 B2* | 5/2009 | Kim et al. | 323/205 |
| 8,564,257 B2* | 10/2013 | Park et al. | 323/235 |
| 8,618,747 B2* | 12/2013 | Park et al. | 315/307 |
| 8,810,230 B2* | 8/2014 | Ayukawa et al. | 323/288 |
| 9,088,223 B2* | 7/2015 | Park et al. | |
| 2005/0013076 A1* | 1/2005 | Zverev et al. | 361/90 |
| 2005/0146908 A1* | 7/2005 | Feldtkeller | 363/125 |
| 2011/0304212 A1* | 12/2011 | Choi et al. | 307/66 |
| 2012/0133285 A1 | 5/2012 | Kelly | |

* cited by examiner

POWER FACTOR CORRECTION

TECHNICAL FIELD

The present invention relates to a method and circuit for performing power factor correction.

BACKGROUND TO THE INVENTION

The power factor of an AC electric power system is the ratio of the real power flowing to the load to the apparent power in the circuit and is a dimensionless number between 0 and 1. It is desirable for the power factor to be as close to 1 as possible.

The power factor correction (PFC) circuits are often used within power supply applications in which AC/DC rectification is performed. Such rectifying arrangements typically comprise a full wave voltage rectifier (usually a diode bridge) and an output capacitor to provide regulation of the output waveform at the output bus. This type of rectifying arrangement only draws current from the AC supply when the full wave rectifier voltage is greater than the voltage across the output capacitor. This is unsatisfactory as it gives an inefficient current profile of the input AC current consisting of separated narrow pulses of current having large peak values. The high harmonic content of this current profile gives a low power factor (typically 0.5) of the rectifying arrangement as a whole.

The power factor is improved by applying a PFC circuit between the diode bridge and the output capacitor. Such a PFC circuit essentially comprises an inductor followed by a diode, with a switch (typically an FET) connected between the inductor and the diode to ground.

By rapidly switching the switch on and off, the inductor is repeatedly first connected directly to ground via the switch and then connected to the output capacitor (via the diode) when the switch is turned off. When the switch is on the current flow through the inductor increases and, during the subsequent time period in which the switch is off, the current decreases, effectively pushing current through the diode to charge the output capacitor. By adjusting the on and off times of the switch by a suitable power factor control circuit the output voltage may be adjusted to a fixed, desired value (target value), although the output voltage is always higher than the input voltage because of the action of the diode in conjunction with the "boosting" action of the inductor.

Figure 1:
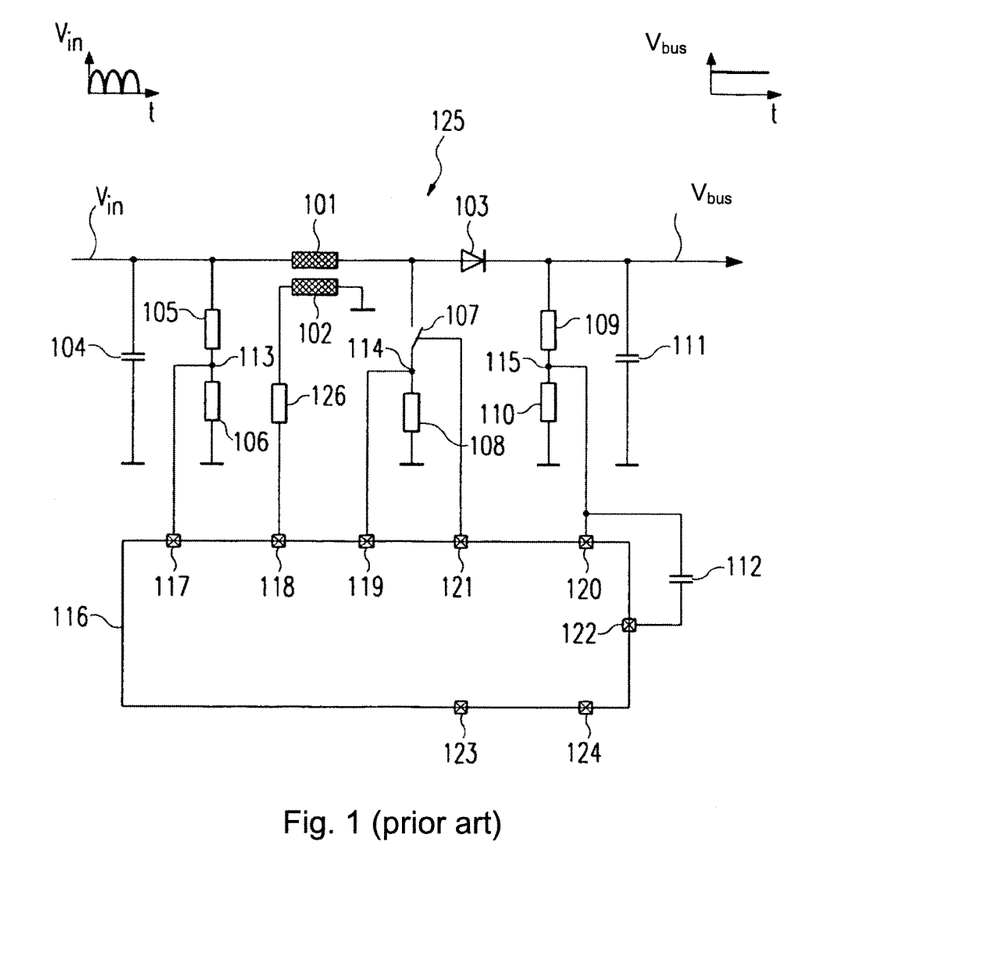
FIG. 1 shows a prior art power factor correction circuit.

FIG. 1 shows such a known power factor correction circuit 125, based on a boost converter topology. A smoothing capacitor 104 filters a rectified AC input voltage (typically from a bridge rectifier) that is measured by a voltage divider 105, 106. The rectified input voltage is applied to an inductor 101. A secondary winding 102 detects the zero crossings of the current through the inductor 101. A current sensing resistor (shunt) 108 connected to the source of a switch 107 (typically a FET) allows the detection of the inductor peak current to determine a possible over-current condition. In parallel with an output capacitor 111, a second voltage divider 109, 110 is arranged to measure the DC output voltage and a surge condition, for example, due to by load variations.

The above four measurements that take place in the power factor correction circuit 125 by means of four measuring inputs 117, 118, 119 and 120 of an electronic control circuit 116. The control circuit 116 additionally has an output 121, through which the switch 107 is controlled. The electronic control circuit 116 is typically arranged as an ASIC. A total of five pins are used for power factor correction.

In this power factor correction circuit 125 the rectified input voltage is fed to the inductor 101. The inductor 101 is by means of the switch 107 either loaded or unloaded. The on-time of the switch 107 and thus the load time of the inductor 101 is controlled based upon a comparison of the measured DC output voltage $V_{bus}$ with a fixed reference voltage. The switch 107 is turned off to discharge the inductor 101 until the current through the inductor 101 has fallen to zero (as detected by the secondary winding 102). The switch 107 is cycled with a much higher frequency (at least 10 kHz) than the frequency of the mains voltage (typically 50 Hz) and the frequency of rectified DC input voltage (typically 100 Hz)

To reduce costs power factor correction arrangements which include an electronic control circuit with only a single pin for receiving measurement inputs are know—for example from DE 102004025597 and WO 2011009717. Obtaining an indication of the mains voltage with such a single input pin PFC approach is difficult. Detection of low mains voltage is important, for example, as it may indicate a power failure—see, for example Standard VDE0108.

It is an object of an embodiment of the present invention to provide improved detection of low mains (or other input) voltage to a lamp. It should, however, be appreciated that the invention is applicable to PFC circuits that power devices other than lamps.

SUMMARY OF THE INVENTION

According to a first aspect of the present invention, there is provided a method of power factor correction in which an input voltage is applied to an inductor which is cyclically discharged through a diode by the operation of a switch, the method including: operating a controller to obtain an indication of the voltage across the switch, monitoring the indication of the voltage across the switch to determine when the inductor reaches a discharged state in response to the switch being in an off state, and the switch being controlled by the controller to vary the on period of the switch, during which the inductor is charged, for adjusting an output voltage towards a target value, characterised by the controller monitoring at least one of the indication of the voltage across the switch and the ratio of the switch on period to the switch off period for detecting that the input voltage has a low value.

In the embodiment to be described, the controller detects that the input voltage has the low value when the ratio of the switch on period to the switch off period exceeds a ratio threshold, preferably for at least a predetermined period. In the embodiment the controller detects that the input voltage has the low value when the on period of the switch exceed twice the off period of the switch. Other ratios may be used, in dependence upon the circumstances.

In the embodiment the controller detects that the input voltage has the low value when the indication of the voltage across the switch is below a voltage threshold, preferably for at least a predetermined period.

In the embodiment the step of monitoring the indication of the voltage across the switch, to determine when the inductor reaches a discharged state in response to the switch being in an off state, ends after a maximum time period, even if no indication of the switch being in the off state is received.

In the embodiment described, it is possible to calculate when an abnormal input mains voltage $V_{in}$ is present, either when the input voltage $V_{in}$ decreases gradually, or when it decreases abruptly (such as the AC voltage is cut off—when a power failure occurs). Detecting this situation can be particularly advantageous to indicate that a power failure has occurred, prior to the change over of a circuit from AC mains power to DC battery power, or vice versa. Such switching occurs in order to provide emergency lighting in the event of a power failure.

In the embodiment the controller controls the switch using information from a single input. This single input provides the indication of the voltage across the switch. In the embodiment the switch is a field effect transistor (FET), and the single input is an indication of a voltage across the drain to source of the FET.

In the embodiment the controller is an ASIC, and includes the two pins for performing power factor correction, one of which receives the single input mentioned above, and the other of which controls the switch—by controlling at what times a voltage is applied to the gate of the FET.

According to a second aspect of the present invention, there is provided a power factor correction circuit including an inductor, a diode, a switch and a controller, operable such that an input voltage applied to the inductor is cyclically discharged through the diode by the operation of the switch, wherein: the controller is operable to obtain an indication of the voltage across the switch, the controller is operable to monitor the indication of the voltage across the switch to determine when the inductor reaches a discharged state in response to the switch being in an off state, and the switch being controlled by the controller to vary the on period of the switch, during which the inductor is charged, for adjusting an output voltage towards a target value, characterised in that the controller is operable to monitor at least one of the indication of the voltage across the switch and the ratio of the switch on period to the switch off period for detecting that the input voltage has a low value.

As another aspect of the present invention, there is provided an electronic driver for a lightsource comprising a power factor correction circuit according to this invention. The electronic driver for the lightsource may include a driver circuit to power the lightsource which is fed by the output of the power factor control circuit. The lightsource may be, for example a gas discharge lamp, LED or OLED.

BRIEF DESCRIPTION OF THE DRAWINGS

For a better understanding of the present invention an embodiment will now be described by way of example, with reference to the accompanying drawings, in which.

DETAILED DESCRIPTION OF EMBODIMENT OF THE INVENTION

Figure 2:
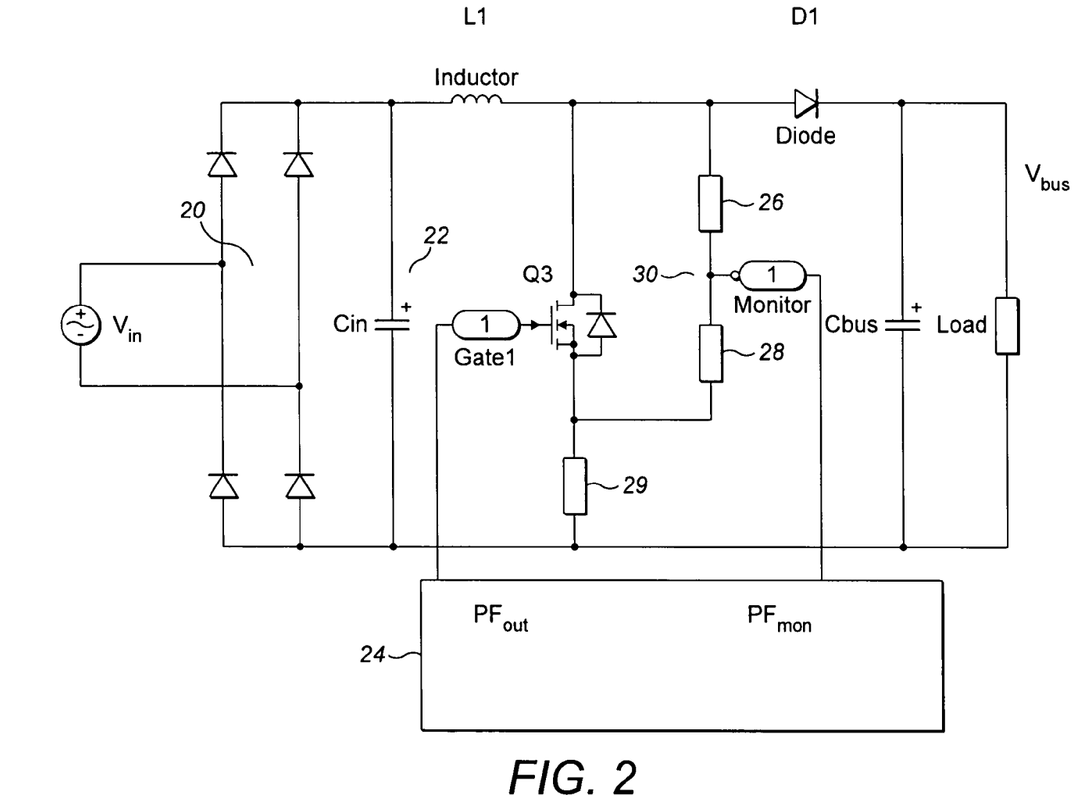
FIG. 2 shows a power factor correction circuit in accordance with the embodiment of the present invention, including an electronic control circuit.

FIG. 2 shows a power factor correction circuit in accordance with an embodiment of the present invention. A sinusoidal input voltage $V_{in}$ (for example 230v AC mains voltage) is applied to a bridge rectifier 20. The resultant voltage at the input capacitor 22 comprises a succession of half sine waves of the same polarity. (It should, however, be understood that the PFC circuit of the present invention can also be used with an input DC voltage.) The capacitor 22 filters out unwanted high frequency noise.

The rectified input voltage is applied to inductor L1. A diode D1 is connected between the inductor L1 and the output bus at which the output voltage $V_{bus}$ is provided across output capacitor $C_{bus}$.

A switch (in this embodiment a FET) Q3 has its drain connected between the inductor L1 and the diode D1 and its source connected to ground. The gate of the switch Q3 is controlled by the single PFC output $PF_{out}$ of electronic control circuit 24, which in the embodiment is an ASIC. Resistors 26 and 28 are connected in series to form a voltage divider arrangement which is coupled in parallel between the source of the switch Q3 and to a point between the drain of the switch Q3 and the diode D1. A further resistor 29 is connected in series between the source of the switch Q3 and ground and has a much smaller resistance than the resistance of resistors 26 and 28. The voltage at measuring point 30 between the resistors 26 and 28 is monitored by the single power factor control input pin $PF_{mon}$ of the electronic control circuit 24.

Briefly, the normal operation of this circuit is as follows. The electronic control circuit 24 output $PF_{out}$ selects an appropriate on time duration $T_{on}$ for the switch Q3 and applies a voltage to the gate of the switch Q3 to close the switch during period $T_{on}$. The current in the inductor L1 increases during the period $T_{on}$. When the period $T_{on}$ ends, the output $PF_{out}$ of the electronic control circuit 24 controls the gate of the switch Q3 to open the switch, starting the period $T_{off}$. During the time period $T_{off}$ the energy stored in the inductor L1 during the period $T_{on}$ is gradually discharged and is pushed through the diode D1 to charge the output capacitor $C_{bus}$. By adjusting the $T_{on}$ and $T_{off}$ periods the output voltage $V_{bus}$ can be adjusted, but is always higher than the input voltage because of the action of the diode in conjunction with the boosting action of the inductor L1. The switch is cycled at a frequency (e.g. 10 kHz) much higher than the frequency of the input mains voltage (e.g. 50 or 60 Hz). Conventionally, the power factor control circuit would be operated to maintain the output voltage $V_{bus}$ at the bus at a constant target value, $V_{bus\_target}$.

In normal operation the power factor control circuit operates in a continuous conduction mode (CCM) with zero crossing of the inductor current. In the CCM the period $T_{off}$ should end as soon as the current flowing through the inductor falls to substantially zero. As mentioned above, conventionally, the zero crossing of the current from the inductor is measured using a secondary winding provided in relation to the inductor L1. However, providing such a secondary winding increases the cost of the power factor correction circuit. Further, for the secondary winding to be monitored by the electronic control circuit 24, an additional input pin to receive the measurement signal from the secondary winding would be required, which would add to the size, complexity and cost of the electronic control circuit.

According to the present embodiment the electronic control circuit 24 estimates whether the current from the inductor L1 is zero using the signal applied to the $PF_{mon}$ input of the electronic control circuit 24.

When the switch Q3 is open during time period $T_{off}$ the input $PF_{mon}$ to the electronic control circuit 24 from measurement point 30 provides an indication of the voltage across the switch Q3. This voltage corresponds substantially to the output bus voltage $V_{bus}$ from the beginning of the time period $T_{off}$ until the inductor discharge current reaches zero. When the inductor current reaches zero, the measured voltage by $PF_{mon}$ reduces, and then represents the current in Q3 during time period $T_{on}$.

Figure 3:
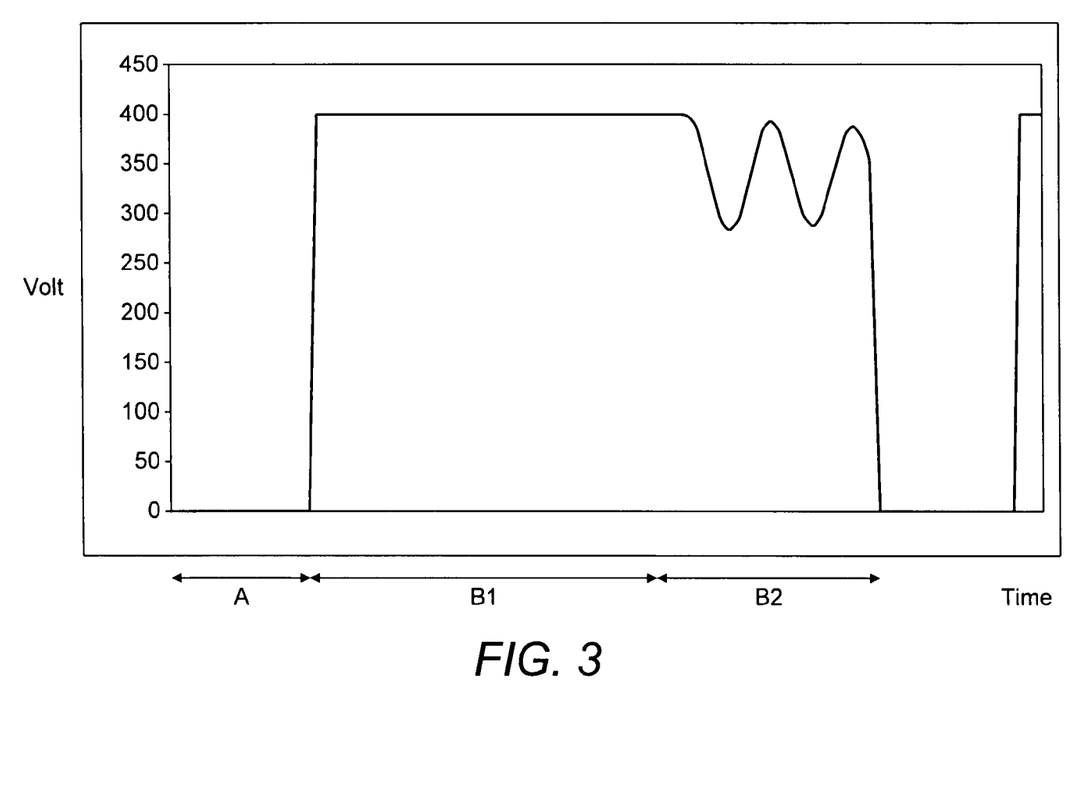
FIG. 3 shows the voltage across the switch of the circuit of FIG. 2 This signal combined with the current in Q3 appears at pin $PF_{mon}$ of the electronic control circuit.

FIG. 3 shows a waveform typical of the voltage across the switch Q3, which is monitored by $PF_{mon}$.

Time period A corresponds to $T_{on}$, when switch Q3 is closed and the inductor L1 is charged. During this period A the voltage at $PF_{mon}$ is zero. When the switch is then opened, time period $T_{off}$ begins, as represented by time periods B1 and B2 in FIG. 3. During time period B1 the inductor L1 is steadily discharged and the current flowing through the diode D1 gradually deceases from an initial relatively high current. During time period B1 the voltage $PF_{mon}$ corresponds substantially to the output voltage $V_{bus}$ (400 volts in this example). However, as the current from the inductor L1 reaches zero, at the beginning of time period B2, the voltage $PF_{mon}$ reduces.

A threshold of the $PF_{mon}$ voltage is set at which the electronic control circuit 24 determines that the inductor current has reached zero. For example, when the voltage $PF_{mon}$ falls to a zero current indicator value it is determined by the electronic control circuit 24 that the zero inductor current point has been reached. The zero current indicator value may be 90% of the voltage measured at $PF_{mon}$ during the time period B1 immediately preceding the current time period B2. The voltage may be measured at the beginning of period B1, after a predetermined delay from the start of time period B1, or by detecting the voltage a plurality of times during time period B1 and averaging (e.g. calculating the arithmetical mean of) the voltages, or using the highest or lowest value of the plurality of voltages. In response to the determination, that the voltage has reached the zero current indicator value electronic control circuit 24 closes the switch Q3, thereby ending the time period $T_{off}$ and beginning the next time period $T_{on}$.

The electronic control circuit 24 calculates the output voltage $V_{bus}$ indicated by $PF_{mon}$ during time period B1 and compares this to a target output voltage $V_{bus\_target}$. If the indicated output voltage is less than the target value, then the time period $T_{on}$ is increased. Conversely, if the indicated output voltage is greater than the target output voltage, then the time period $T_{on}$ is decreased.

Obtaining an indication of the mains input voltage $V_{in}$ with such a two pin PFC approach shown in FIG. 2 is difficult in some circumstances. Detection of low input voltage $V_{in}$ is important for implementing VDE0108.

As the input voltage $V_{in}$ increases relative to the output voltage $V_{bus}$, the electronic control circuit 24 increases the ratio of $T_{off}:T_{on}$—the decrease in the period $T_{on}$ reducing the voltage boost in order to maintain the output voltage $V_{bus}$ constant. Likewise, as the input voltage $V_{in}$ decreases relative to the output voltage $V_{bus}$, the electronic control circuit 24 decreases the ratio of $T_{off}:T_{on}$—the increases in the period $T_{on}$ increasing the voltage boost in order to maintain the output voltage $V_{bus}$ constant. The ratio $T_{off}:T_{on}$ should therefore give an indication of the input mains voltage $V_{in}$.

However, for this ratio to vary in a predictable manner with different values of mains voltage, the point at which the zero inductor current flow occurs must be detectable by the electronic control circuit 24, so that the transition between time period $T_{off}$ and $T_{on}$ can be performed by the electronic control circuit 24. If the zero inductor current cannot be detected, then electronic control circuit 24 cannot determine when the time period $T_{off}$ should end and the next time period $T_{on}$ should begin.

The electronic control circuit 24 may (in some implementations) perform some failure check of the measurement and may only accept a sample at $PF_{mon}$ as a valid indication of a zero crossing if such a failure check is passed.

The electronic control circuit 24 may (in some implementations) include a timer that times the duration of the $T_{off}$ period. When the $T_{off}$ period exceeds a maximum value $T_{off\_max}$ (for example, 800 ms), the electronic control circuit 24 may then automatically close the switch Q3, thereby ending the time period $T_{off}$ and beginning the next time period $T_{on}$, even though no zero inductor current crossing has been detected. Whilst such an arrangement allows the PFC circuit to continue operating, the ratio of $T_{off}:T_{on}$ is no longer proportional to the input mains voltage $V_{in}$. This is an example where the ratio of $T_{off}:T_{on}$ no longer gives an indication of the mains voltage $V_{in}$.

From the discussion above, it will be understood that the point at which the inductor current reaches zero is detected by measuring at $PF_{mon}$ the voltage across the drain and source of the switch Q3. The electronic control circuit 24 determines when the voltage at $PF_{mon}$ falls to below 90% of the bus voltage value $V_{Bus}$ (measured at $PF_{mon}$ during period B1 in FIG. 3) as an indication that there is zero inductor current.

It is proposed to use the ratio of $T_{on}:T_{off}$ to indicate a low mains voltage $V_{in}$. If $T_{on}>=2 \cdot T_{off}$, then this is an indication of a low mains voltage $V_{in}$. Other ratios of $T_{on}:T_{off}$ may be used. The ratio may be programmable or adaptive (i.e. adjusted during operation in response to measurement results).

As mentioned above, when the $T_{off}$ period exceeds the maximum value $T_{off\_max}$ (for example, 800 ms), and the electronic control circuit 24 may (in some implementations) then automatically close the switch Q3, thereby ending the time period $T_{off}$ and beginning the next time period $T_{on}$, even though no zero inductor current crossing has been detected. This may prevent a low mains voltage $V_{in}$ being detected by the above-mentioned ratio in some circumstances (because $T_{on}$ will not be $>=2 \cdot T_{off\_max}$).

Also, if the mains input voltage $V_{in}$ is switched off from a nominal or high operating voltage to zero, normal PFC operation quickly ceases, as the inductor current collapses. Only the input capacitor 22 maintains the input, but only for a few milliseconds.

The embodiment seeks to provide an indication of low mains input voltage $V_{in}$ even in these challenging circumstances.

The embodiment will now be described in relation to the flowchart of FIGS. 4A and 4B.

At step A a counter is reset to zero.

Prior to step B the switch Q3 is opened, and time period B1 ($T_{off}$) begins. At step B the voltage at pin $PF_{mon}$ is sampled to obtain an indication of the bus voltage $V_{bus}$, this value being referred to as "Sample $V_{bus}$".

At step C the zero indicator current threshold at which the voltage at $PF_{mon}$ indicates a zero crossing event is calculated (90% of the detected output bus voltage $V_{bus}$ during time period B1 in this example).

When the voltage at pin $PF_{mon}$ falls below the zero indicator current threshold, it is determined that the zero current stage has been reached At step D the control logic calculates a new time period $T_{on}$ based on the measurements made at pin $PF_{mon}$. For example, the control logic may determine the difference between the indicated bus voltage $V_{bus}$ at pin $PF_{mon}$ during time period B1 and the target bus voltage $V_{bus\_target}$. If the indicated bus voltage is less than the target bus voltage $V_{bus\_target}$, then the new time period $T_{on}$ will be increased over the previous time period $T_{on}$. Conversely, if the indicated bus voltage is greater than the target bus voltage $V_{bus\_target}$, then the new time period $T_{on}$ may be decreased compared with the previous time period $T_{on}$.

At step E, the time period $T_{off}$ ends and the control logic signals at pin $PF_{out}$ to switch the switch Q3 on, to begin the next time period $T_{on}$. This occurs either when a zero crossing is detected, or when $T_{off}=T_{off\_max}$ (in case the maximum value $T_{off\_max}$ is applied and has been reached).

At step F, when the time period $T_{on}$ (as determined by step D) ends, the control logic signals at pin $PF_{out}$ to switch the switch Q3 off, in order to begin the next time period $T_{off}$.

At step G it is determined whether the condition $T_{off}<T_{on}/2$ is satisfied. As indicated above, if this condition is true, it is an indication of low input mains voltage $V_{in}$.

At step G if the condition is true, then at step H the counter (referred to in step A) is incremented.

If the condition at step G is not true, then at step I it is determined if the sample $V_{bus}$ value is less than a threshold $V_{bus\_limit}$, for example 100 volts.

If at step I the sample $V_{bus}$ value is below the threshold $V_{bus\_limit}$, then at step J the counter is incremented.

On the other hand, if at step I it is determined that the sample $V_{bus}$ value is greater than or equal to the threshold $V_{bus\_limit}$, then at step K the counter is reset to zero.

Step L is performed following step H, J and K. At step L it is determined if the counter exceeds a limit value. In this example, the limit value is a counter value that indicates that a time t has expired (e.g. 10 milliseconds) since the last counter reset (either at step A or step K).

The incrementing of the counter at steps H and J may be performed such as the incrementing stops once the counting has exceeded the limit value.

If at step L it is determined that the counter has exceeded the limit value, then at step M it is determined that the input voltage $V_{in}$ is a low voltage and the condition "Vin NOT OK" is true. "Vin NOT OK" is true indicates a low input voltage $V_{in}$, and "Vin NOT OK" is true may be applied a circuit or controller (e.g. to the control circuit 24) so that appropriate action can be taken). The procedure than returns to step B.

If at step L it is determined that the counter is less than or equal to limit value, the procedure returns to step B.

The Sample $V_{bus}$ value used at step I may be a sample $V_{bus}$ value taken for the purpose of performing PFC operation. Alternatively, this may be a special sample specifically for the purpose of comparison with the $V_{bus\_limit}$ value. The special sample $V_{bus}$ values may be taken at intervals of a few hundred micro seconds from the commencement of time period $T_{off}$ (which may be close to mains input voltage $V_{in}$), or as frequently as the control circuit 24 may permit (for example, by virtue of the operation of an analogue to digital converter (ADC) within the control circuit 24).

If special Sample $V_{bus}$ values are taken, these may be flagged to indicate that these samples are taken for the purpose of comparison with the $V_{bus\_limit}$ value, so that they are not used in the control logic feedback loop for adjusting the $T_{off}$:$T_{on}$ ratio.

Figure 4A:
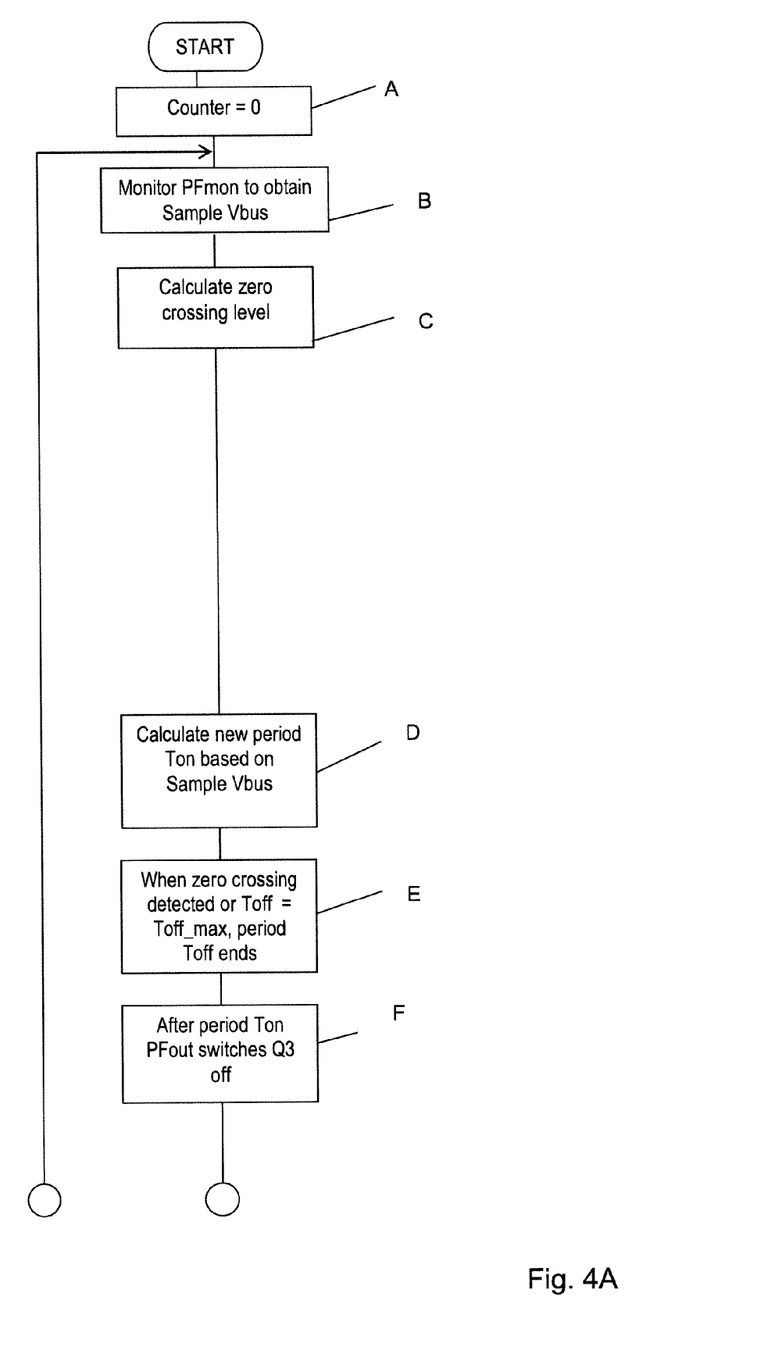
FIGS. 4A and 4B are a flowchart showing the steps performed in accordance with the power factor correction procedure of the embodiment of the present invention in order to detect a low input voltage.
Figure 4B:
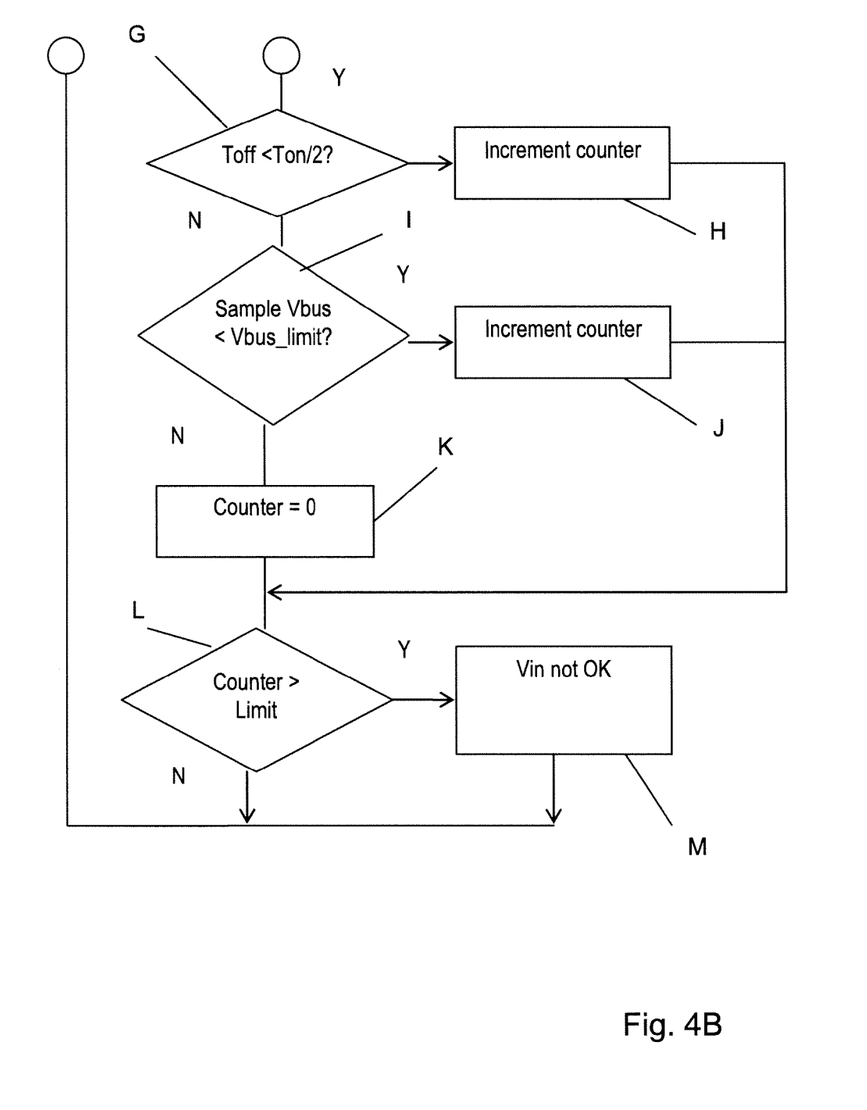
Figure 5:
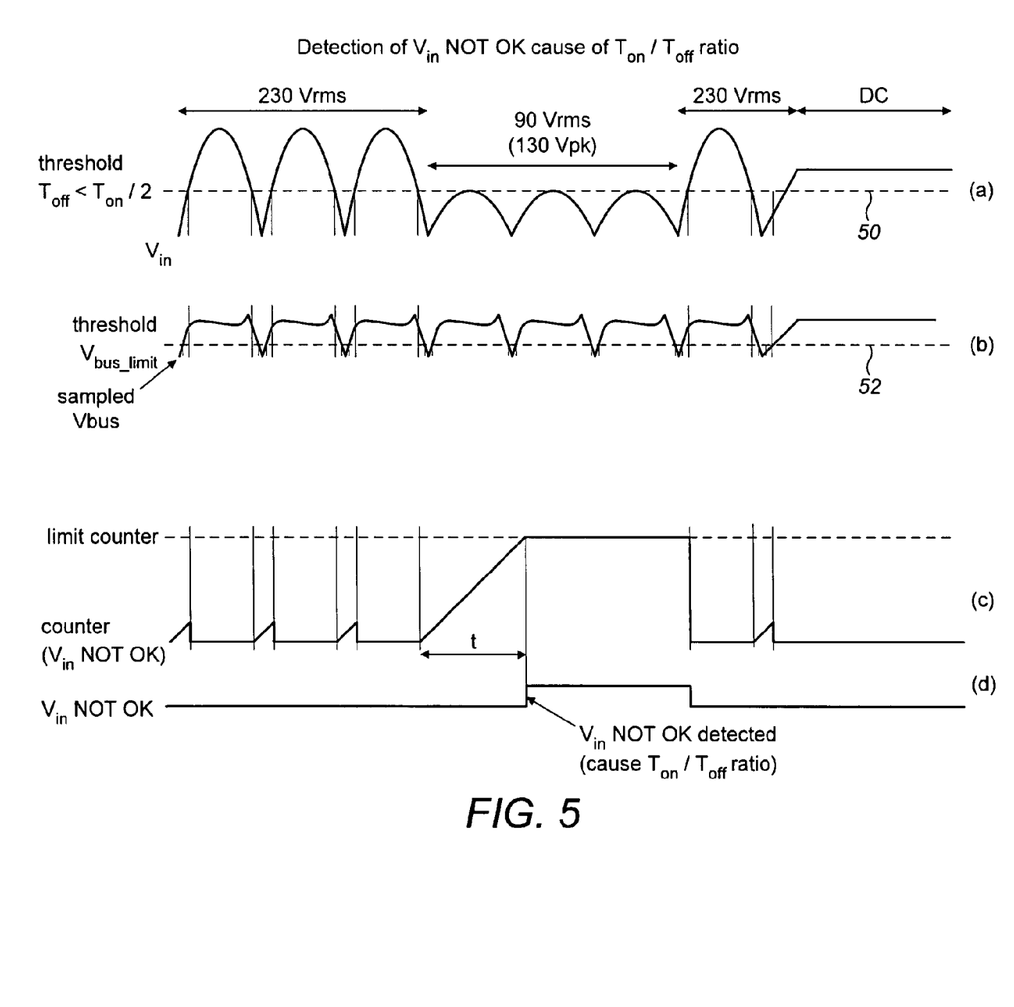
FIG. 5 is a timing diagram which shows how the ratio of $T_{off}$ to $T_{on}$ varies as the input voltage varies, and how a low input voltage is detected when the input voltage decreases gradually.
Figure 6:
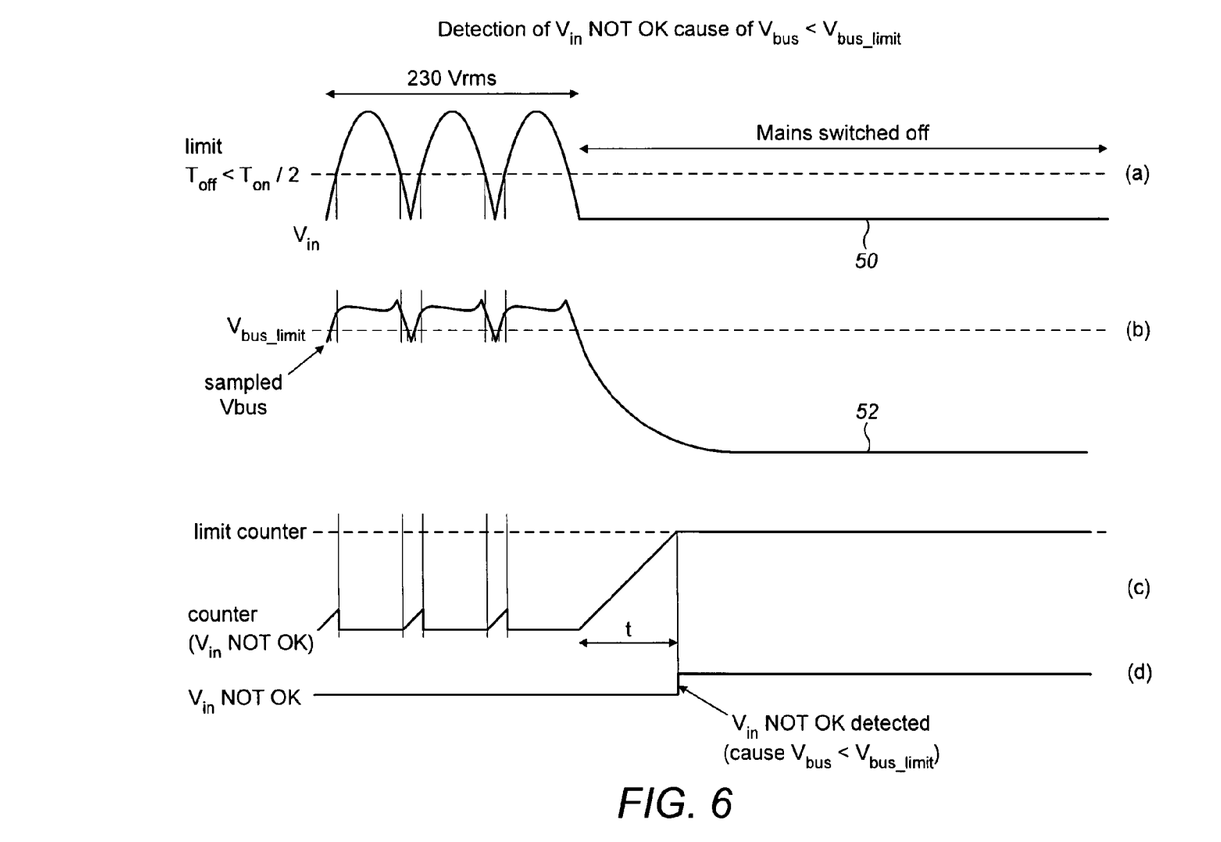
FIG. 6 is a timing diagram which shows how the ratio of the $T_{off}$ to $T_{on}$ varies as the input voltage varies, and how a low input voltage is detected when the input voltage ceases suddenly.

The effect of the flowchart of FIG. 4 can be seen by consulting the waveform timing diagrams of FIGS. 5 and 6.

Waveform (a) shows the voltage of the rectified input voltage $V_{in}$ over a period of time. The dashed line 50 indicates when $V_{in}$ has such a value that $T_{off}<T_{on}/2$.

Waveform (b) indicates the Sample $V_{bus}$ value at $PF_{mon}$. The dashed line 52 indicates the $V_{bus\_limit}$ value.

Waveform (c) shows the counter value.

Waveform (d) shows when Vin NOT OK is true.

In FIG. 5 the input mains voltage $V_{in}$ is initially at a normal value of 230 volts (rms). However, it can be seen that after an initial time period, the input mains voltage $V_{in}$ reduces to a lower value of 90 volts (rms, 130 volts peak). This can be considered to be a gradual reduction in the input voltage $V_{in}$. The PFC circuit reduces the $T_{off}$ period relative to the $T_{on}$ period in order to endeavour to maintain the $V_{bus}$ voltage at the value $V_{bus\_target}$. This results in the condition $T_{off}<T_{on}/2$ being true for a sustained time period. During this time period counter is repeatedly incremented (at step H in the flow chart) until the counter exceeds the limit value (at step L in the flow chart). This is detected (at step M in the flow chart) and an indication is provided that the input voltage $V_{in}$ is an unusually low value, and $V_{in}$ NOT OK becomes true.

FIG. 6 shows a different situation in which the input mains voltage $V_{in}$ is initially at a usual value of 230 volts (rms). The mains is then switched off completely and rapidly falls to zero volts. Conventionally, normal PFC operation would stop working at this point, and the ratio of $T_{on}$:$T_{off}$ would not provide an indication of the input voltage $V_{in}$. However, when the mains voltage is switched off, it is detected (at step I of the flow chart) that the sampled $V_{bus}$ voltage is less than the $V_{bus\_limit}$ value (of 100 volts in the example), and the counter is incremented (at step J of the flow chart). When the mains voltage $V_{in}$ has been turned off for sustained period, the counter exceeds the limit value (at step L of the flow chart) and the condition "$V_{in}$ NOT OK" is triggered (at step M of the flow chart)—indicating that the mains voltage is at an abnormally low value.

In the embodiment described, it is possible to calculate when an abnormal input mains voltage $V_{in}$ is present, both when the input voltage $V_{in}$ decreases gradually, and when it decreases abruptly (such as the AC voltage is cut off—when a power failure occurs). Only one of these two techniques may be performed. The invention encompasses using either one of these techniques individually, or both these techniques together.

Detecting a low mains input voltage $V_{in}$ situation can be particularly advantageous to indicate that a power failure has occurred, prior to the change over of a circuit from AC mains power to DC battery power, or vice versa. Such switching occurs in order to provide emergency lighting in the event of a power failure.

The total duration of the abnormally low input voltage $V_{in}$ may be calculated. If the duration is short, a lamp driven by the circuit may be subject to a fast re-start (with less pre-heating). If the duration is longer, the lamp may be subject to a full re-start (with full pre-heating).

The invention claimed is:

1. A method of power factor correction in which an input voltage ($V_{in}$) is applied to an inductor (L1) which is cyclically discharged through a diode (D1) by the operation of a switch (Q3), the method comprising:
    operating a controller (24) to obtain an indication of the voltage across the switch (Q3),
    monitoring the indication of the voltage across the switch (Q3) to determine when the inductor (L1) reaches a discharged state in response to the switch being in an off state, and
    the switch (Q3) being controlled by the controller (24) to vary the on period of the switch (Q3), during which the inductor is charged, for adjusting an output voltage ($V_{bus}$) towards a target value ($V_{bus\_target}$),
    the controller (24) monitoring a ratio of the switch on period ($T_{on}$) to the switch off period ($T_{off}$) for detecting that the input voltage ($V_{in}$) has a value below a predetermined threshold, to indicate that a power failure has occurred, prior to a changeover of a circuit from AC mains power to DC battery power, or vice versa.

2. The method of claim 1, wherein the controller (24) detects that the input voltage ($V_{in}$) has the value below a predetermined threshold when the ratio of the switch on period ($T_{on}$) to the switch off period ($T_{off}$) exceeds a ratio threshold.

3. The method of claim 2, wherein the controller (24) detects that the input voltage ($V_{in}$) has the value below a predetermined threshold when the ratio of the switch on period ($T_{on}$) to the switch off period ($T_{off}$) exceeds the ratio threshold for a predetermined period.

4. The method of claim 2, wherein the controller (24) detects that the input voltage ($V_{in}$) has the value below a predetermined threshold when the on period ($T_{on}$) of the switch exceeds twice the off period ($T_{off}$) of the switch.

5. The method of claim 1, wherein the controller (24) detects that the input voltage ($V_{in}$) has the value below a predetermined threshold when the indication of the voltage across the switch (Q3) is below a voltage threshold.

6. The method of claim 5, wherein the controller (24) detects that the input voltage ($V_{in}$) has the value below a predetermined threshold when the indication of the voltage across the switch (Q3) is below the voltage threshold for a predetermined period.

7. The method of claim 1, further comprising the step of monitoring the indication of the voltage across the switch (Q3), to determine when the inductor (L1) reaches a discharged state in response to the switch being in an off state, ends after a maximum time period ($T_{off\_max}$).

8. A power factor correction circuit including an inductor (L1), a diode (D1), a switch (Q3) and a controller (24), operable such that an input voltage (Vin) applied to the inductor (L1) is cyclically discharged through the diode (D1) by the operation of the switch (Q3), wherein:
the controller (24) is operable to obtain an indication of the voltage across the switch (Q3), the controller (24) is operable to monitor the indication of the voltage across the switch (Q3) to determine when the inductor (L1) reaches a discharged state in response to the switch being in an off state, and
the switch (Q3) being controlled by the controller (24) to vary the on period of the switch (Q3), during which the inductor is charged, for adjusting an output voltage ($V_{bus}$) towards a target value ($V_{bus\_target}$), the controller (24) is operable to monitor a ratio of the switch on period ($T_{on}$) to the switch off period ($T_{off}$) for detecting that the input voltage ($V_{in}$) has a value below a predetermined threshold, to indicate that a power failure has occurred, prior to a changeover of a circuit from AC mains power to DC battery power, or vice versa.

9. The circuit of claim 8, wherein the controller (24) is operable to detect that the input voltage ($V_{in}$) has the value below a predetermined threshold when the ratio of the switch on period ($T_{on}$) to the switch off period ($T_{off}$) exceeds a ratio threshold.

10. The circuit of claim 9, wherein the controller (24) is operable to detect that the input voltage ($V_{in}$) has the value below a predetermined threshold when the ratio of the switch on period ($T_{on}$) to the switch off period ($T_{off}$) exceeds the ratio threshold for a predetermined period.

11. The circuit of claim 9, wherein the controller (24) is operable to detect that the input voltage ($V_{in}$) has the value below a predetermined threshold when the on period ($T_{on}$) of the switch exceeds twice the off period ($T_{off}$) of the switch.

12. The circuit of claim 8, wherein the controller (24) is operable to detect that the input voltage ($V_{in}$) has the value below a predetermined threshold when the indication of the voltage across the switch (Q3) is below a voltage threshold.

13. The circuit of claim 12, wherein the controller (24) is operable to detect that the input voltage ($V_{in}$) has the value below a predetermined threshold when the indication of the voltage across the switch (Q3) is below the voltage threshold for a predetermined period.

14. The circuit of claim 9, wherein the controller (24) is operable to monitor the indication of the voltage across the switch (Q3), to determine when the inductor (L1) reaches a discharged state in response to the switch being in an off state, only for a maximum time period ($T_{off\,max}$).

15. An electronic driver for a lightsource comprising a power factor correction circuit of claim 8.

* * * * *